(12) United States Patent
Fung et al.

(10) Patent No.: US 7,818,294 B2
(45) Date of Patent: Oct. 19, 2010

(54) APPARATUS, SYSTEM, AND METHOD FOR IMPLEMENTING AN IMS SOAP GATEWAY

(75) Inventors: Haley Hoi Lee Fung, Alviso, CA (US); Shyh-Mei F. Ho, Cupertino, CA (US); Srividhya Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 11/246,754

(22) Filed: Oct. 7, 2005

(65) Prior Publication Data

US 2007/0094283 A1   Apr. 26, 2007

(51) Int. Cl.
*G06F 17/30* (2006.01)
(52) U.S. Cl. ...................... 707/617; 707/618
(58) Field of Classification Search ................. None
See application file for complete search history.

(56) References Cited

U.S. PATENT DOCUMENTS

| 2003/0061404 | A1  | 3/2003  | Atwal et al. ............... 719/328 |
| 2003/0074485 | A1  | 4/2003  | Zhdankin et al. ........... 719/316 |
| 2003/0110167 | A1* | 6/2003  | Kim .............................. 707/4 |
| 2003/0229665 | A1  | 12/2003 | Ryman ...................... 709/203 |
| 2004/0117199 | A1  | 6/2004  | Fremantle et al. ............. 705/1 |
| 2004/0220952 | A1  | 11/2004 | Cheenath ................... 707/100 |
| 2005/0050228 | A1  | 3/2005  | Perham et al. .............. 709/246 |

OTHER PUBLICATIONS

IMS SOAP Gateway Preview Sample Download http://www-306.ibm.com/software/data/ims/soap/download.html, Mar. 2004.
IMS SOAP Gateway http://www-306.ibm.com/software/data/ims/soap/, Mar. 2005.
IMS Family http://www-306.ibm.com/software/data/ims/, Mar. 2005.
In New IBM IMS Version 9, Integration Comes Standard, from *The Mainstream*, Issue 13, 2005 http://www-306.ibm.com/software/swnews/swnews.nsf/n/lsan6apnu5?OpenDocument&Site, Jan. 2005.

* cited by examiner

*Primary Examiner*—Baoquoc N To
(74) *Attorney, Agent, or Firm*—Kunzler Needham Massey & Thorpe

(57) ABSTRACT

An apparatus, system, and method are disclosed for implementing an Information Management System (IMS) simple object access protocol (SOAP) gateway. The gateway extracts an identifier from a SOAP-based web service request received from a web service client and selects a correlation mapping based on the extracted identifier. The gateway builds a modified web service request, updated with parameters from the correlation mapping. The added parameters allow the gateway to direct the web service request to a specific IMS Connect software product instance, a specific IMS software product instance, a specific IMS application instance, and a specific datastore. The gateway also returns a web service response containing response values related to the original request to the SOAP enabled web service client.

17 Claims, 8 Drawing Sheets

APPARATUS, SYSTEM, AND METHOD FOR IMPLEMENTING AN IMS SOAP GATEWAY

BACKGROUND OF THE INVENTION

1. Field of the Invention

This invention relates to providing a web service and more particularly relates to providing a gateway configured to allow SOAP clients to access web services provided by an Information Management System (IMS) software product.

2. Description of the Related Art

Traditional computer applications provide computing services through an application interface. As an example, a word processor application allows a user to develop a text document using a computer. The word processor runs on a single computer and presents an interface to the user, normally on the same computer on which the word processor is running. A user sees a graphical representation of a document and edits the document using an interface provided by the word processor.

With the advent of the Internet, users often access information through web pages. A web server computer serves a web page, written using hypertext markup language (HTML) to client computers. A user of a client computer uses a web browser to access a web page on a web server computer using hypertext transport protocol (HTTP). A web browser typically establishes an HTTP session over a TCP/IP connection from the web browser computer to the web server computer. The world wide web (WWW) comprises a combination of web server computers and web service client computers connected using internet protocol (IP) which comprises transmission control protocol (TCP) and user datagram protocol (UDP).

Companies today provide services on the world wide web to their customers and others. Such services include transactional banking services, retail sales transactions, and information access services. Although companies could provide these services through HTML pages to users of web browsers, companies are beginning to provide automated services over the web using web services.

A web service is a specialized transactional service provided by a web service provider to a web service client. The web service client communicates with the web service provider using simple object access protocol (SOAP). SOAP is an XML-based messaging protocol that utilizes HTTP as a transport. As an example, a client application may initiate a request for the latest temperature reading at the John Wayne Airport. The client contacts a web service provider which maintains temperature recordings for the John Wayne Airport. The client initiates the request by sending a web service request in a SOAP message and receives a web service response in a SOAP message. The client retrieves the temperature value from the response. In this manner, web service clients are able to access vast amounts of data from databases and other sources using web services.

However, web service clients cannot currently access many of the largest transactional systems housing some of the largest databases of information and time proven transactional functionality. Legacy systems such as the International Business Machines (IBM) Information Management System (IMS) are not accessible as native web services. Some of the world's largest banks and institutions use IMS to maintain their financial databases. In an effort to meet this need, some companies, including IBM, are building web-server based access systems. Many of these systems utilize J2EE (Java 2, Enterprise Edition) to translate HTTP (Hyper Text Transport Protocol) calls into XML-based queries. As an example, IBM produces the Websphere web server product. The Websphere product presents a web page interface to web browsers. The Websphere product utilizes J2EE to translate web browser requests into XML requests to an IMS hierarchical database. However, in many implementations, the J2EE platform creates exorbitant overhead due to its large, bulky, and slow design. The inefficiencies of the J2EE platform increase the expense of a web server-based J2EE solution.

Unfortunately, currently available products do not enable clients to communicate with IMS using native XML. Although the owners and operators of IMS systems would like to provide a secure, efficient method to natively access IMS systems using XML, no such system exists today. In providing such an access method, owners of IMS systems must maintain strict security regulations imposed by government laws and business requirements.

From the foregoing discussion, it should be apparent that a need exists for an apparatus, system, and method to access legacy IMS systems using SOAP enabled web service clients. Beneficially, such an apparatus, system, and method would provide a highly efficient and secure method for web service clients to natively access transactional IMS databases using XML.

SUMMARY OF THE INVENTION

The present invention has been developed in response to the present state of the art, and in particular, in response to the problems and needs in the art that have not yet been fully solved by currently available technology. Accordingly, the present invention has been developed to provide an apparatus, system, and method for implementing an IMS SOAP gateway that overcome many or all of the above-discussed shortcomings in the art.

The IMS SOAP gateway is provided with a logic unit containing a plurality of modules configured to functionally execute the necessary steps to implement the gateway. These modules in the described embodiments include an IMS software product or IMS module, an IMS Connect software product or IMS connect module, an IMS datastore, an IMS application, a SOAP endpoint, a SOAP message processor, a correlation module, a header module, and an IP connection module.

The IMS software product provides a transaction engine connected to a hierarchical database management system. The IMS Connect module provides a front end to the IMS software product configured to send and receive XML encoded messages over a TCP/IP connection while communicating with the IMS software product using legacy messaging schemes. The IMS datastore is a storage module contained within the IMS software product, and the IMS application is a procedure or program runs in response to the transactional requirements of the IMS software product.

The SOAP endpoint may accept and/or initiate SOAP conversations with SOAP-enabled web service clients. The SOAP processor decapsulates XML web service requests from SOAP messages and encapsulates XML web service responses in SOAP messages.

The correlation module extracts an identifier from a web service request message and selects a correlation mapping based on the extracted identifier. The header module in turn builds and combines a header with the web service request. The new header is based on parameters contained in the selected correlation mapping. These parameters may include an IMS datastore identifier, an IMS Connect identifier, an IMS application identifier, and an adapter name, as well as other parameters. The IP connection module forwards the modified web service request to the IP connection module which in turn forwards the web service request to the IMS connect module for further processing. The continued processing of the web service request is dependent on the parameters added to the web service request by the header module.

Typically, the IMS connect module returns a web service response to the IP connection module which may be returned synchronously or asynchronously. In the synchronous processing model, the gateway sends the web service response back to the web service client on the same SOAP connection conversation. However, in the asynchronous model, the correlation module may extract a second identifier from the web service response and selects a correlation mapping for the return trip based on the extracted second identifier.

A signal bearing medium capable of carrying out a method of the present invention is also presented. The signal bearing medium contains computer readable instructions which allow a computing device or a computing system to implement the gateway described above.

A method of deploying a SOAP gateway of the present invention is also presented. The method in the disclosed embodiments substantially includes the steps necessary to deploy an IMS SOAP gateway. The deployed gateway is essentially capable of carrying out the functions presented above with respect to the operation of the described gateway. In one embodiment, the method includes deploying a gateway in a computing device or in a computing system, wherein the deployed gateway carries out the functions of receiving a SOAP message; extracting an identifier from the web service request; selecting a correlation mapping based on the extracted identifier and updating the web service request with parameters from the correlation mapping.

The deployed gateway may further forward the updated web service request to an IMS connect module and receive a web service response and return the web service response back to a web service client from which the web service request originated.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
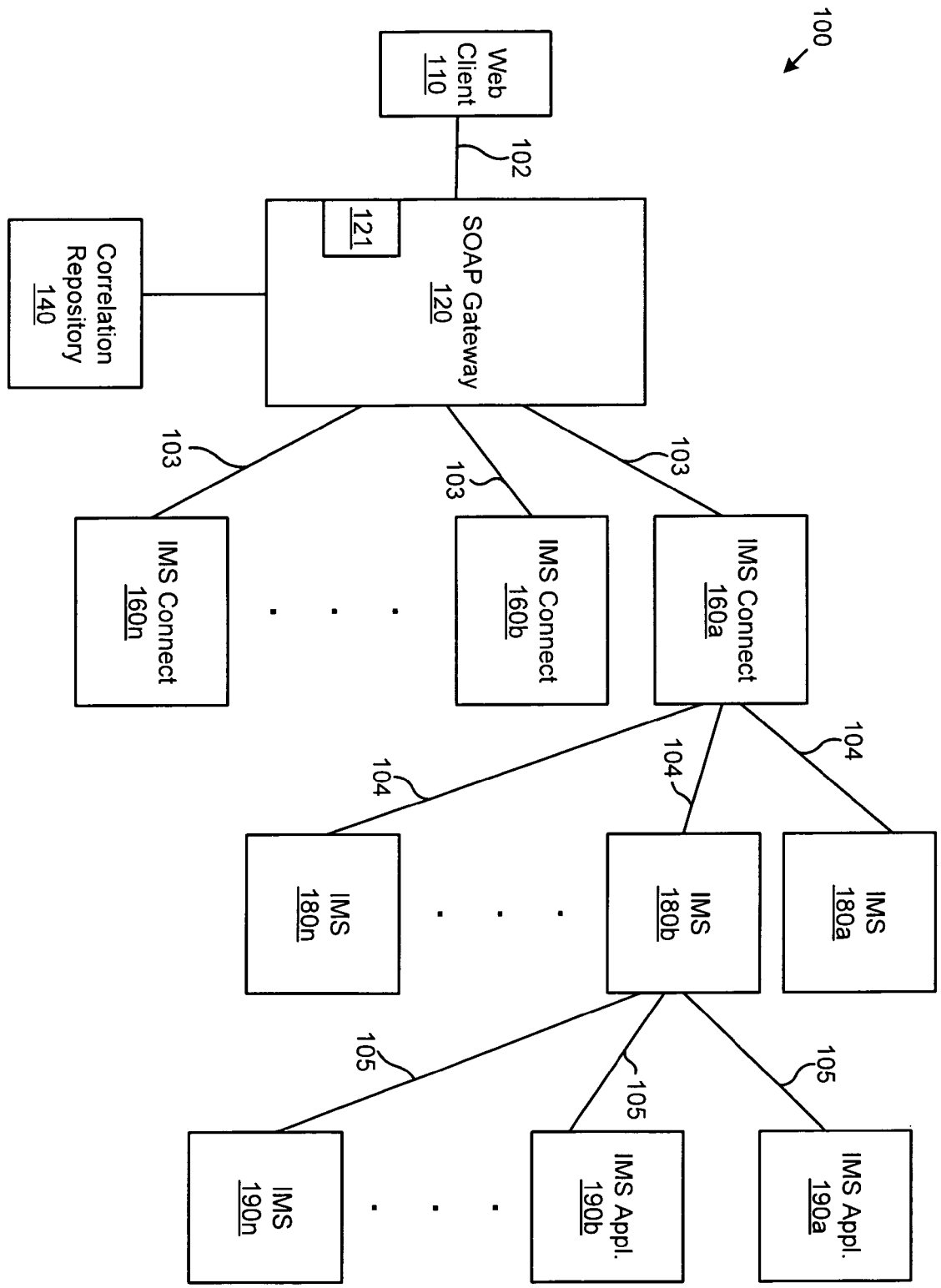
FIG. 1 is a schematic block diagram illustrating one embodiment of a system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of causing execution of a program of machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates a system 100 for implementing an Information Management System (IMS) simple object access protocol (SOAP) gateway. The system 100 includes a web service client 110, a SOAP gateway 120, an IMS Connect module software product 160, an IMS module software product 180, and an IMS application 190.

As illustrated, a single gateway 120 may connect to a plurality of IMS Connect modules 160a-n. Similarly, a single IMS Connect module 160a may connect to a plurality of IMS modules 180a-n, and a single IMS module 180b may connect to a plurality of IMS applications 190a-n. It is to be understood that the IMS Connect module 160, the IMS module 180 and the IMS application 190 may execute on a single computing device or each may execute on separate computing devices. Indeed, an International Business Machines (IBM) mainframe sysplex may present a single interface to non-sysplex machines while the sysplex itself may comprise a single computing device or multiple computing devices, typically mainframe computers running OS/390 or z/OS.

The design of the system 100 allows a web service client 110 to request a web service from gateway 120 without any knowledge of the complexity of the entire system 100. The system 100 routes a request from the web service client 110 to the gateway 120 and then to the appropriate IMS Connect module 160, the appropriate IMS module 180, and to the appropriate IMS application 190. The design of the system 100 further ensures that a response from the IMS application 190 will travel back through the appropriate IMS module 180, through the appropriate IMS Connect module 160, and to the gateway appropriate 120. Thus, the gateway 120 provides a simple external web service interface to the web service client 110. The gateway 120 shields the web service client 110 from the complexity of the system 100 and from the need to understand the flows and controls inherent in the system 100.

The web service client 110 typically is a software application running on a computing device connected to an intranet, extranet, internet or other IP based network. The web service client 110 is capable of creating XML-based requests and sending those requests to a web service provider. After creating an XML encoded request, the web service client encapsulates the request in a SOAP envelope and transmits the request to a web service provider over a SOAP conversation. Normally, web service provider responds by sending a SOAP based XML response over the same SOAP conversation. The web service client 110 may optionally retrieve a description of the parameters and interface supported by a potential web service provider and may use the parameters and interface description in constructing web service requests.

The gateway 120 acts as an interface between web service clients 110 and IMS Connect modules 160. The gateway 120 sends SOAP messages to, and receives SOAP messages from, web service clients 110 over SOAP conversation 102. The gateway 120 also sends XML messages to and receives XML messages from IMS Connect modules 160 over TCP/IP connection 103. In this manner, the gateway 120 presents a web service provider interface to the web service client 110 while hiding the complexity of system 100. The gateway 120 modifies requests received from the web service client 110 to include correlation parameters which allow the system 100 to route requests to the appropriate IMS Connect module 160, the appropriate IMS module 180, and the appropriate IMS application 190.

By providing a web service provider interface, the gateway 120 allows web service clients 110 to access legacy applications using modern software techniques. Similarly, by providing an XML interface to legacy systems, the gateway 120 allows legacy systems to interact with modern software products without having to rewrite the legacy systems to understand modern software interfaces. The gateway 120 retrieves correlation parameters from a correlation repository 140. The gateway 120 modifies web service requests to include appropriate correlation parameters.

The correlation repository 140 comprises sets of correlation mappings. Each correlation mapping comprises a set of correlation parameters. The correlation repository may be a file containing a plurality correlation mappings. The correlation repository may comprise a single file or a group of files. Those of skill in the art will realize that alternative forms could be used to store sets of correlation parameters in a correlation repository 140.

In one embodiment, the gateway 120 selects a mapping from the correlation repository 140 based on a universal resource name (URN) contained in a web service request received from a web service client 110. The URN serves as a web service provider identifier (WSPID), and the gateway 120 uses the WSPID as an index into the correlation repository 140 to select a correlation mapping. Thus, the correlation repository 140 contains a mapping that allows the gateway 120 to present a simple web service provider interface to the web service client and properly communicate with the complex system 100.

The IMS module 180 provides transactional services and database services. In one embodiment, the IMS module 180 includes the IMS Connect module 160 and the IMS application 190 within a single unit. However, the IMS module 180, the IMS Connect module 160 and the IMS application 190 may comprise separate functional units.

The IMS Connect module 160 provides a TCP/IP interface between legacy IMS applications 190a-n and modern software clients. IMS Connect module 160 presents an XML interface for XML based communication while making legacy calls using traditional language protocols, such as COBOL formatted calls, for communications with IMS 180b. Using XML and XML schemas, software developers define parameter names and parameter formats which can be easily modified and extended.

In contrast, communication with legacy systems such as an IMS module 180 requires precise byte encodings. The IMS Connect module, in one embodiment, translates XML messages into byte encodings which the IMS 180 understands and then calls 104 the IMS module 180 using an Open Transaction Manager Access (OTMA) protocol. The IMS Connect module utilizes some of the correlation parameters mentioned above to properly translate the XML messages and to select the appropriate IMS module 180. The IMS Connect module 160 allows XML capable applications to access the IMS module 180 without requiring code modifications to be made to the IMS module 180. Advantageously, this permits continued use of legacy systems without large development expenses.

In one embodiment, the IMS module 180 may comprise a legacy transaction manager. Large banks and other institutions throughout the world extensively use the IMS module 180 to process millions of transactions each day. As mentioned above, the IMS module 180 communicates with the IMS Connect module 160 using the OTMA protocol. Working in cooperation with an IMS application 190, the IMS module 180 provides the bulk of the web service data processing of the system 100. Timeframes for making modifications to the IMS 180 are typically measured in years owing to the complexity of the system and the testing required before a new release becomes available. The long lead times for changes to the IMS module 180 make it advantageous to implement the IMS gateway 120 to allow modem web service clients to access the benefits of the IMS module 180 using SOAP and XML technologies.

The IMS application 190 is a software module connected to the IMS module 180. Typically, an IMS application 190 processes an individual transaction under the direction of the IMS module 180. The IMS module 180 may call an IMS application 190 using a queuing call 105. For example, an IMS application 190 may retrieve the balance from a specific bank account in response to an account query transaction and return the balance to the IMS module 180 over a call 105.

The gateway 120 may advertise the available web services that the gateway 120 offers an industry standard file known as a web services description language (WSDL) file. The gateway 120 advertises available services through the WSDL file 121. The WSDL file 121 may also advertise parameters which should be included on a web service request for a given web service.

The web service client 110 initiates a web service request by building an extended markup language (XML) message in compliance with the WSDL file 121 that corresponds with the desired web service. The client 110 encodes the various parameters in the web service request according to the WSDL file 121 specification.

In one embodiment, the WSDL file 121 advertises a web service under a specific web service name. The web service name may be a universal resource indicator (URI) or a universal resource name (URN). The web service client 110 encodes the web service name into the web service request along with other parameters specified in the WSDL file 121 as an XML message. The web service client 110 encapsulates the web service request in a SOAP envelope, establishes a SOAP conversation with the gateway 120 and sends the web service request over the SOAP conversation 102 to the gateway 120.

The gateway 120 is configured to receive the web service request and extract an identifier from the web service request. The identifier may be the web service name or some other identifier specified in the web service request and required by the WSDL file 121. The identifier may comprise a web service provider identifier (WSPID). The gateway 120 accesses a correlation mapping within the correlation repository 140 using the extracted identifier as an index.

The gateway 120 uses the extracted correlation mapping to update the web service request. The updated web service request may include parameters which identify the proper IMS Connect module instance 160a, the proper IMS module instance 180b, the proper IMS application 190b, and optionally a specific database to be used in processing the web service request.

The system 100 provides various modules, methodologies, and parameters for accessing a web service comprising a gateway 120, a plurality of IMS Connect modules 160, a plurality of IMS modules 180, and a plurality of IMS applications 190. The web service client 110 uses a SOAP message to communicate the initial web service request to the gateway 120. The design of the system 100 allows an IMS module 180b executing one or more IMS applications 190a-n to provide web services to SOAP clients 110 without modifying the software of the IMS module 180 or the IMS applications 190. Advantageously, this allows IMS operators to leverage existing software and databases to provide web-based services without rewriting and updating legacy IMS applications 190a-n. In addition, the gateway 120 allows web service client developers to create native SOAP web service clients in a variety of programming languages without reliance on other forms of transport or protocols such as java-based web service clients or web browser-based web service clients.

Figure 2:
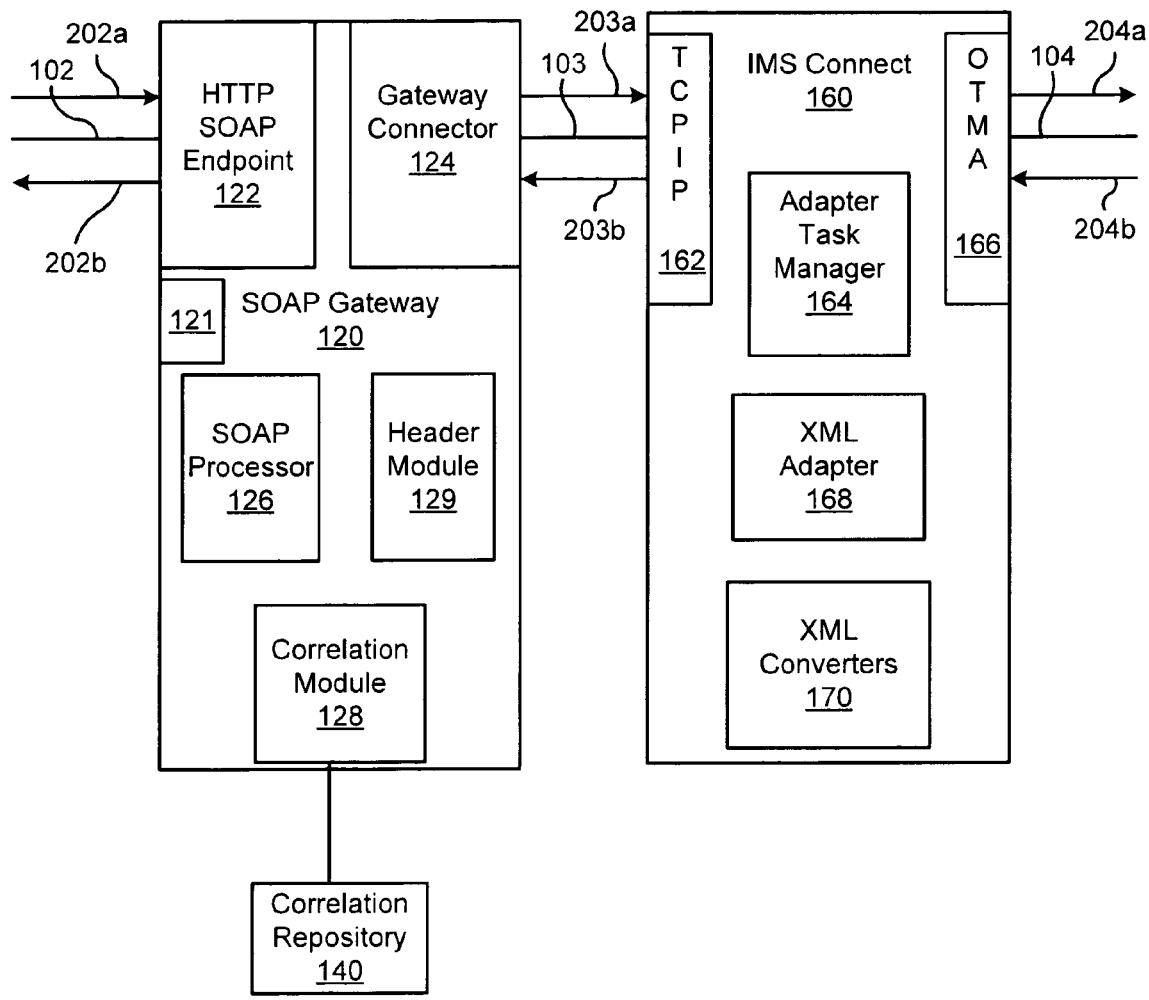
FIG. 2 is a schematic block diagram of two modules of a system in accordance with the present invention.

FIG. 2 illustrates a block diagram of a gateway 120 connected to an IMS Connect module 160 via a TCP/IP connection 103. The gateway 120 comprises an HTTP SOAP endpoint 122, a gateway connector 124, a SOAP processor 126, a correlation module 128, and a header module 129. In addition, the SOAP gateway 120 may further comprise one or more WSDL files 121 accessible by web service clients 110. The gateway 120 communicates with web service client 110 (See FIG. 1) via SOAP conversation 102.

Figure 3:
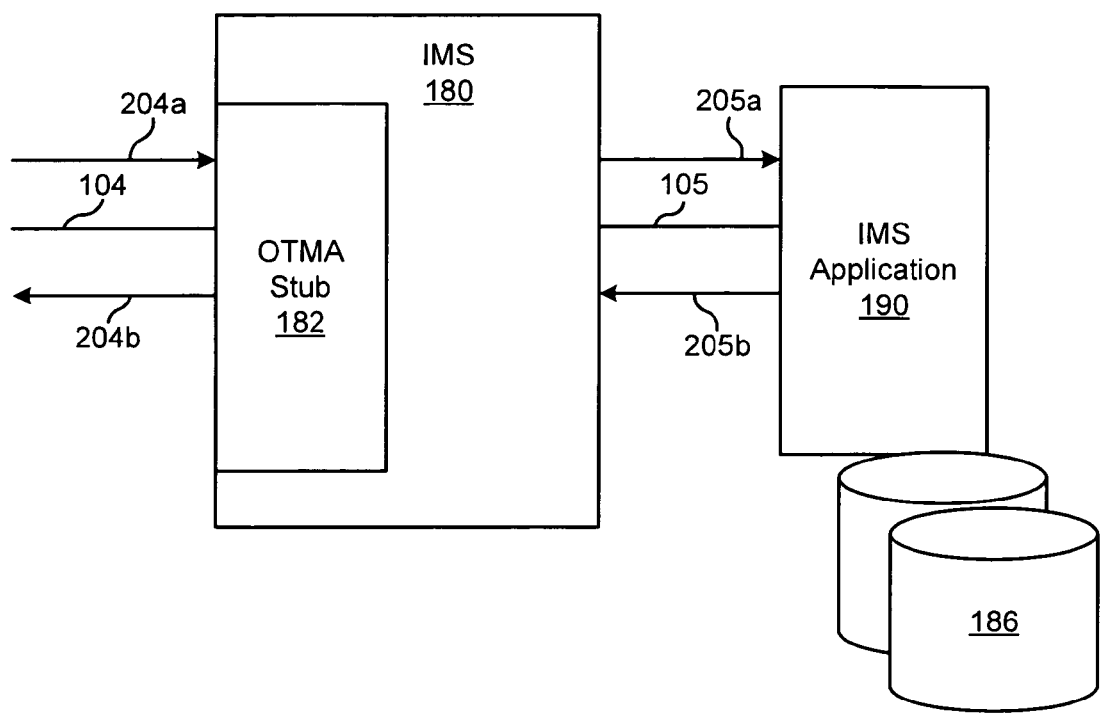
FIG. 3 is a schematic block diagram of two modules of a system in accordance with the present invention.

FIGS. 2 and 3 illustrate various connections and flows. Throughout the description of the various embodiments, a web service request/response encapsulated in a SOAP envelope is referred to as a SOAP web service request 202a. A web service request with no SOAP envelope is referred to as a web service request 203a. An OTMA call containing a web service request is referred to as a web service request call 204a. An OTMA response call containing a web service response is referred to as a web service response call 204b. A web service response without a SOAP envelope is referred to as a web service response 203b, and a web service response with a SOAP envelope is referred to as a SOAP web service response 202b.

The IMS Connect module 160 comprises a TCP/IP module 162, an OTMA module 166, an adapter task manager 164, an XML adapter 168, and an XML converter 170. IMS connect module 160 communicates with the gateway 120 via a TCP/IP connection 103 and with IMS module 180 (See FIG. 1) via an OTMA call 104.

The HTTP SOAP endpoint 122 establishes a SOAP conversation 102 with a web service client 110. The SOAP conversation 102 typically utilizes HTTP as a transport mechanism. In one embodiment, the HTTP session utilizes a TCP/IP connection to TCP port 80. Many firewalls are configured to allow TCP/IP sessions to port 80. Using the HTTP transport to port 80 typically reduces the amount of firewall reconfigurations necessary to allow a SOAP session 102 from a web service client 110 to a gateway 120. Of course, the SOAP conversation could be configured to utilize a different TCP port.

The SOAP processor 126 decapsulates SOAP messages received from HTTP SOAP endpoint 122. Typically, the SOAP processor 126 parses a SOAP message and extracts an XML message from a SOAP web service request 202a. The SOAP processor 126 also encapsulates web service responses 203b to create SOAP web service responses 202b.

The gateway connector 124 establishes a TCP/IP connection 103 with the TCP/IP module 162 of the IMS Connect module 160. The gateway connector 124 may also be termed an IP connection module. The gateway connector 124 sends web service requests 203a over the TCP/IP connection 103 to IMS Connect module 160 and receives web service responses 203b over the TCP/IP connection 103 from IMS Connect module 160

The TCP/IP connection 103 generally comprises a five-tuplet: a source IP address, a source port number, a destination IP address, a destination port number and a protocol. Generally, the gateway connector 124 uses its own source IP address and a source port number provided by the IP stack running on the gateway 120. The destination IP address and optionally the destination port number may be specified as correlation parameters in the selected correlation mapping. Typically, the protocol is TCP (transmission control protocol), but the UDP (unreliable delivery protocol) could be used as well. The protocol could also be specified as a correlation parameter. A single gateway connector 124 may connect to a plurality of IMS Connect modules 160 using a plurality of TCP/IP connections 103. The gateway connector 124 chooses among the plurality of IMS Connect modules 160a-n according to a correlation parameter contained in a correlation mapping selected from the correlation repository 140.

In one embodiment of system 100, the web service client 110 sends a SOAP web service request 202a to the HTTP SOAP endpoint 122 over the SOAP conversation 102. The SOAP endpoint 122 passes the SOAP web service request 202a to the SOAP processor 126. The SOAP processor 126 removes the SOAP envelope from the SOAP web service request 202a, leaving an XML web service request 203a. The SOAP processor 126 forwards the web service request 203a to the correlation module 128. The web service request 203a comprises input data which ultimately will be delivered to the IMS application 190 for processing. The web service request 203a further comprises an identifier which uniquely identifies the request web service.

The correlation module 128 extracts the identifier from the web service request 203a. The identifier may be a universal resource name (URN) or other name which uniquely identifies the requested web service. In one embodiment, the gateway 120 makes the identifier available to web service clients 110 via a WSDL file accessible by all web service clients 110. The WSDL file advertises the web services available on the gateway 120 and the parameters needed to properly call those advertised web services.

In one embodiment, the correlation module 128 uses the identifier as a key to access a correlation mapping contained in a correlation repository 140. The correlation repository 140 may contain correlation mappings for each web service available through the gateway 120. The header module 129 updates the web service request 203a by combining a header field comprising various parameters from the correlation mapping with the web service request 203a. The header module 129 then passes the web service request 203a to the gateway connector 124.

The gateway connector 124 may use parameters retrieved from the correlation mapping, to select a TCP/IP connection 103. The gateway connector 124 may be capable of establishing TCP/IP connections 103 to multiple IMS Connect modules 160a-n. The gateway connector 124 sends the updated web service request 203a to a particular IMS Connect module 160 selected according to the parameters in the correlation mapping.

The TCP/IP module 162 receives and establishes TCP/IP connections 103 with the gateway 120. Typically, one gateway 120 connects to a plurality of IMS Connect modules 160a-n. The adapter task manager 164 manages adapter tasks. An adapter task is adapted to call a specific language structure converter. The adapter task manager 164 selects the appropriate adapter based on the correlation parameters. In one embodiment, the adapter task manager 164 selects the appropriate adapter based on one of the correlation parameters which may be an adapter name extracted the web service request 203a. In one example, the adapter task manager 164 calls an XML adapter 168 which in turn calls a common business oriented language (COBOL) XML converter 170 which converts the XML data to a COBOL application data structure format. In FIG. 2, the XML adapter 168 is a COBOL adapter 168. However, the XML adapter 168 and the XML converter 170 could be configured to convert XML data into byte data appropriate for language calls other than COBOL such as PL/1, assembler, and the like.

The IMS Connect module 160 typically receives a web service request 203a comprising an adapter name. As described above, the IMS Connect module 160 and/or the adapter task manager 164 uses the adapter name to select the appropriate adapter task 168 to process the web service request 203a. However, in some instances, no adapter task name is present in the web service request 203a. When no adapter name is present, no language conversion is necessary. In this case, the adapter task 164 passes the original XML message to the OTMA module to be passed on to the IMS module for processing by an IMS application 190. Again, the adapter task 164 may use an identifier extracted from the web service request 203a to determine the selection of the appropriate XML adapter 168 or the decision to call no adapter 168.

The adapter task manager 164 selects the appropriate adapter 168 based on parameters from the correlation mapping added by the header module 129. In the illustrated embodiment, the adapter task manager 164 selects the XML adapter 168 which in turn calls the XML converter 170. The converter 170 converts the XML data from the web service request 203a to application byte data compatible with an OTMA call to an IMS module 180. The OTMA module calls a particular IMS module 180 over an OTMA call 104. The OTMA module 166 passes the application byte data to IMS module 180 through the OTMA call 104. Typically, the application byte data passed from the OTMA module 166 to IMS module 180 is an OTMA web service request call 204a. After IMS processes the call, the IMS module 180 makes a web service response call 204b to the OTMA module 166.

The IMS Connect module 160 passes the data from the web service response call 204b to the adapter task manager 164. The adapter task manager 164 selects the appropriate XML adapter 168 which in turn calls the appropriate XML converter 170. The data from the web service response call 204b is converted from a language specific format, for example COBOL, to an XML based web service response 203b. The TCP/IP module 162 passes web service response 203b over the TCP/IP connection 103 back to the gateway 120.

The gateway connector 124 receives and passes the web service response 203b to the SOAP processor 126. The SOAP processor 126 encapsulates the web service response 203b into a SOAP envelope. In some embodiments, the gateway 120 handles the return processing of the web service response synchronously with the original web service request. For the synchronous model, the original SOAP conversation 102 from the web service client 110 may be active. If the original web service SOAP conversation 102 is active, then the SOAP web service response 202b may be passed directly to the HTTP SOAP endpoint 122 which sends the SOAP web service response 202b to the web service client 110.

In another embodiment, the gateway 120 handles the response processing asynchronously. In the asynchronous embodiment, the correlation module 128 may extract a response identifier from the web service response 203b. The correlation module 128 extracts a correlation mapping from the correlation repository 140 based on the response identifier. The extracted correlation mapping may contain parameters necessary to locate the web service client 110 to which the gateway forwards the SOAP web service response 202b.

Those of skill in the art will understand that many different flows can be designed to handle a web service request and response. The flows illustrated here are just one embodiment of the SOAP gateway 120 functionality and other flows could be designed without departing from the spirit of the invention.

FIG. 3 illustrates an expanded view of one embodiment of the IMS module 180b and an IMS application 190. The IMS module 180b may comprise an OTMA stub 182. The IMS module 180 maintains an OTMA connection 104 with IMS Connect module 160. The OTMA connection 104 is generally not like the TCP/IP connection 103. While the TCP/IP connection 103 is a logical session which the gateway connector 124 and the TCP/IP module 162 maintain, the OTMA session 104 is generally a pair of queues connected to procedure control blocks (PCBs). The OTMA module 166 queues a message to the PCB of the OTMA stub 182. The queuing of a message to the PCB of the OTMA stub 182 causes the operating system (e.g. z/OS) to run the OTMA stub 182. Similarly, the OTMA stub 182 queues messages to the PCB of the OTMA module 166, causing the OTMA module 166 to run and process the queued message.

FIG. 3 further illustrates one embodiment of an IMS application 190 in communication with the IMS module 180. The IMS application 190 communicates with the IMS application 190 through connection 105 which may be similar to the PCB queuing mechanism described in relation to the OTMA connection 104. As mentioned earlier, one IMS module 180b may connect to multiple IMS applications 190a-n. IMS applications 190 typically access at least one datastore 186. The datastore 186 comprises a hierarchical database. The database may contain bank account information for thousands of individual accounts. The IMS application 190 may be an application which queries the datastore 186 to determine the balance of a specific account. Another IMS application 190 may subtract money from one account in the datastore 186 while another application 190 may add money to an account in the datastore 186.

In one embodiment, IMS module 180 receives an OTMA web service request call 204a. The OTMA web service request call 204a is not an XML call. Rather, the OTMA web service request call 204a is formatted according to the byte data requirements of the OTMA stub 162. The IMS application 180 extracts an IMS application identifier and a datastore identifier from the web service request call 204a. As an example, the IMS application identifier might be the transaction code "IVTNO," and the datastore identifier might be "1208." In this example, the IMS module 180 would execute the transaction "IVTNO," and the IMS application "IVTNO" would execute its transaction using the datastore identified by "1208."

The IMS module 180 queues the request call 205a to the PCB of the IMS application 190. IMS application 190 accesses the datastore 186 specified in the web service request call 205a and queues a web service response call 205b back to the IMS module 180. The web service response call 205b may indicate that the web service request call 205a completed successfully or that the web service request call 205a completed unsuccessfully. The web service response call 205b may contain response data such as the bank account balance information originally requested by the web service client 110.

IMS module 180 returns the response message 205b as an OTMA web service response call 204b to the same IMS Connect module 160. IMS Connect module 160 converts the web service response call 204b as described earlier and eventually returns a web service response 203b to the gateway 120 and eventually to the web service client 110 as a SOAP web service response 202b.

It is to be understood that the connections 102, 103, 104, and 105 between the various modules and software components are described here as connections or calls. However, each may be a connection between software modules running on the same computing device or separate computing devices. The types of connections are not limited to the described embodiments. Those of skill in the art will understand that the connections or calls could be remote procedure calls (RPC), TCP/IP calls, procedural software calls, SOAP messages, or other types of communication transmissions. The various connections 102, 103, 104, and 105 simply illustrate that data flow across the connections, normally in both directions at different times during processing. Typically, the web service response path follows the same path which the corresponding web service request call followed. For example, the same instance of the gateway 120 which processes the SOAP web service request 202a also processes the web service response 203b. Similarly, the same instance of the IMS Connect module 160 which processes the web service request 203a also processes the web service response call 204b.

Figure 4:
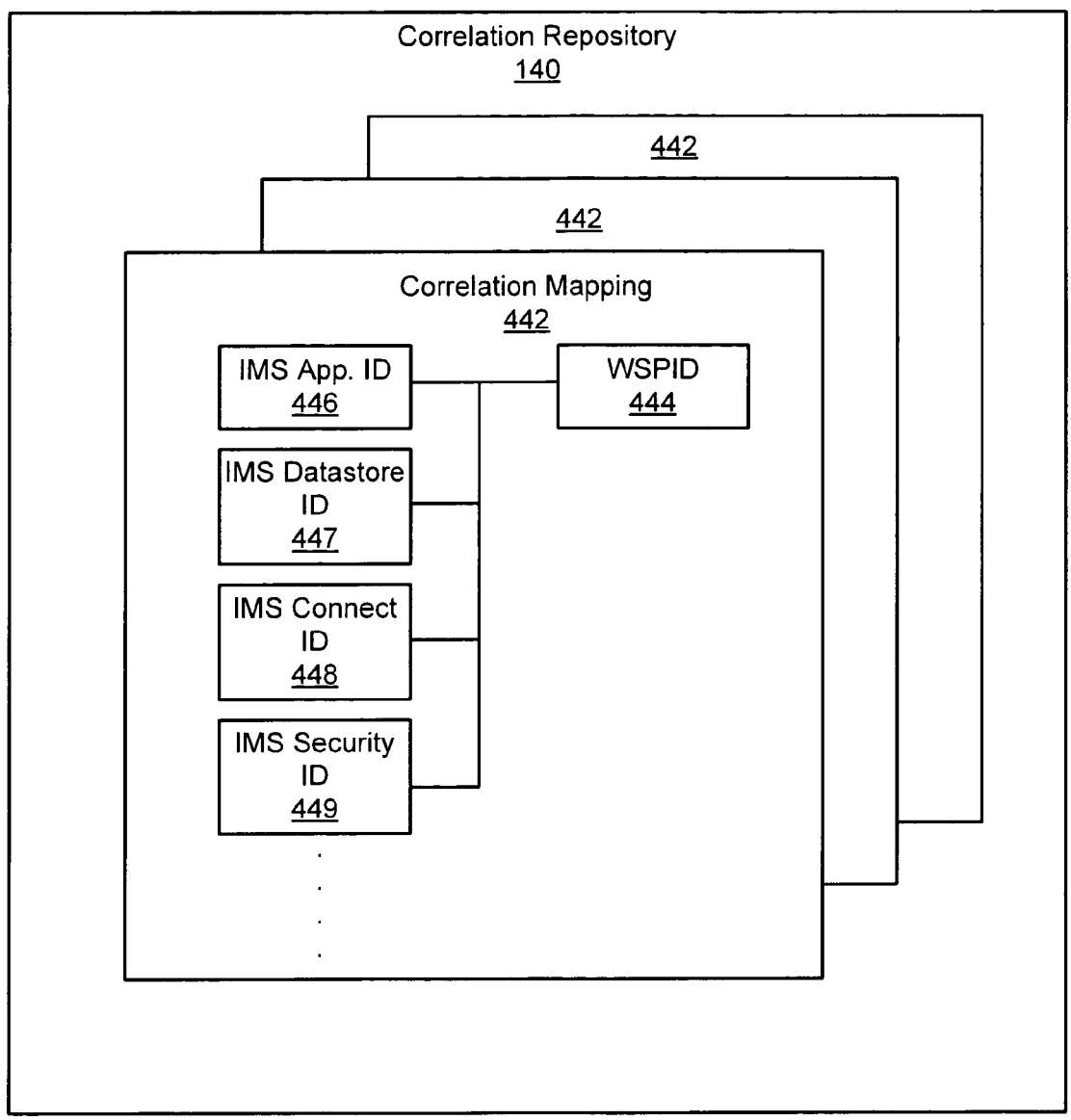
FIG. 4 is a schematic block diagram of one module of a system in accordance with the present invention.

FIG. 4 illustrates one embodiment of a correlation repository 140. The correlation repository 140 comprises a plurality of correlation mappings 442. Each correlation mapping 442 comprises various parameters and identifiers. The depicted correlation mapping 442 comprises a mapping between a web service provider identifier (WSPID) 444 and at least four identifiers: an IMS application identifier 446, an IMS datastore identifier 447, an IMS Connect identifier 448, and an IMS security identifier 449.

As described earlier, a web service client 110 creates a SOAP web service request 202a comprising various parameters including an identifier. The correlation module 128 extracts the identifier, for example, a WSPID 444, from the SOAP web service request 202*a* and selects a correlation mapping 442 from the correlation repository 140 based on the extracted WSPID 444. The header module 129 inserts the parameters from the correlation mapping 442 into the web service request 203*a*. Various components of the system 100 use the inserted parameters to route, authenticate, and process the web service request 203*a*.

The gateway connector 124 uses the IMS Connect identifier 448 to select the appropriate TCP/IP connection 103. The IMS Connect identifier 448 may comprise an IP address or a resolvable internet name and optionally a TCP port number. The gateway connector 124 may use the IP address and TCP port number to select an already existing TCP/IP connection 103 or to create a new TCP/IP connection 103 to a specific IMS Connect module 160*a*.

In one embodiment, the IMS connect identifier 448 further comprises an adapter identifier. The adapter task manager 164 may use the adapter identifier to select the appropriate XML adapter 168 and XML converter 170 to process the request and convert the request to the appropriate byte code format.

The IMS Connect module 160 may use the IMS security identifier 449 to authenticate the web service request. The security identifier 449 may comprise a username and password or other authentication parameters. The IMS Connect module 160 may refuse to reply to a web service request 203*a* containing an invalid IMS security identifier 449.

The IMS application identifier 446 typically identifies the IMS application 190 that the IMS module 180 will use to process the web service request call 204*a*. In one embodiment, the IMS application identifier 446 comprises a one to eight character transaction code, for example "IVTNO." Similarly, the IMS datastore identifier 447 typically identifies the specific datastore 186 or database which the IMS application 190 will use in processing the web service request 205*a*.

Figure 5:
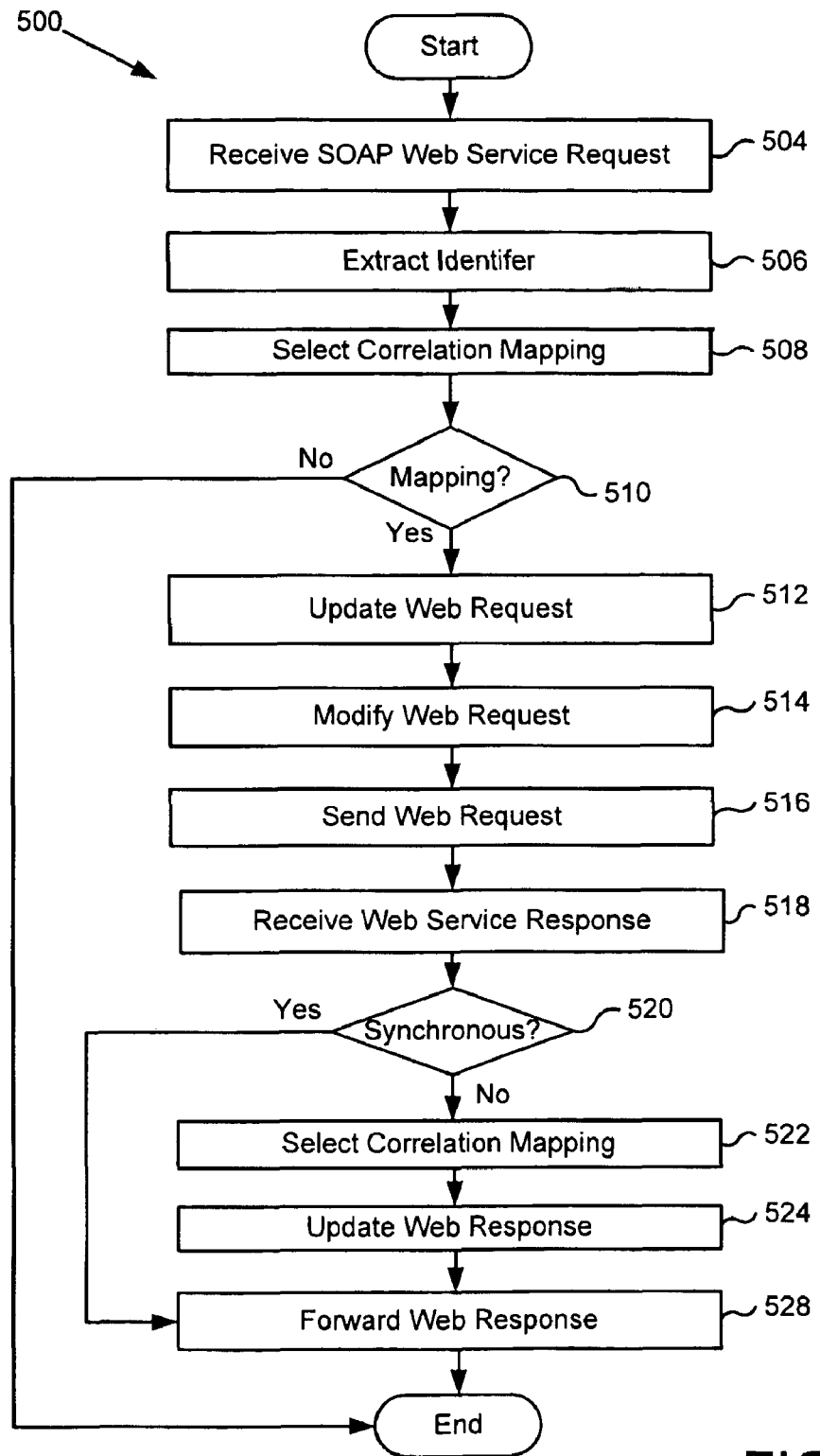
FIG. 5 is a schematic flow chart diagram illustrating one embodiment of a method in accordance with the present invention.

FIG. 5 illustrates one embodiment of a method 500 for implementing an IMS SOAP gateway 120. The method 500 may be implemented using the system 100 discussed above. Those of skill in the art recognize that hardware and software implementing portions of the present invention may be implemented in various modules within the system 100.

Initially, a web service client 110 sends a SOAP web service request 202*a* to the IMS SOAP gateway 120. The gateway 120 receives 504 the SOAP web service request 202*a*. The SOAP endpoint 122 passes the SOAP web service request 202*a* to the SOAP processor 126. The SOAP processor 126 extracts the web service request from the SOAP web service request 202*a*. The correlation module 128 extracts 506 an identifier or WSPID 444 from the web service request 203*a*. The WSPID 444 may be a URN, URI, or other unique identifier. The gateway 120 typically advertises the WSPID 444 to web service clients using a WSDL file 121.

The correlation module 128 further selects 508 a correlation mapping 442 based on the extracted WSPID 444. If the correlation module 128 does not find 510 a correlation mapping 442 with the extracted identifier 444, processing stops. Otherwise, the header module 129 updates 512 the web service request 203*a* with the parameters from the selected correlation mapping 442. In one embodiment, the header module 129 builds a header field and combines the new header field with the web service request 203*a*. The header module 129 preferably builds a header field containing an IMS application identifier 446, an IMS datastore identifier 447, an IMS connect identifier 448, an IMS security identifier 449 as well as other parameters contained in the selected correlation mapping 442.

Next, the gateway 120 forwards the updated web service request 203*a* to the IMS Connect module 160. Typically, the gateway sends 516 the web service request 203*a* to the IMS Connect module 160 over a TCP/IP connection.

After the gateway 120 sends 516, the modified web service request 203*a* to the IMS Connect module 160, the gateway 120 receives 518 a web service response 203*b* from the IMS Connect module 160. Next, the correlation module 128 determines 520 whether the web service response 202*b* is to be sent asynchronously or synchronously. For synchronous processing, the gateway 120 may forward 526 the web service response 202*b* to the web service client 110 over the SOAP connection 102.

For asynchronous processing, the gateway 120 may extract an identifier from the web service response 203*b*. The correlation module 128 may select 522 a correlation mapping 442 from the correlation repository 140 based on the extracted identifier. The selected correlation mapping 442 may have a URI or other parameter which identifies the web service client 110 to which the gateway 120 is to send the web service response 202*b*. The correlation module 128 updates 524 the web service response 202*b*. Next, the HTTP SOAP endpoint 122 forwards 526 the SOAP web service response 202*b* to the web service client 110 identified by the selected correlation mapping 442.

Figure 6:
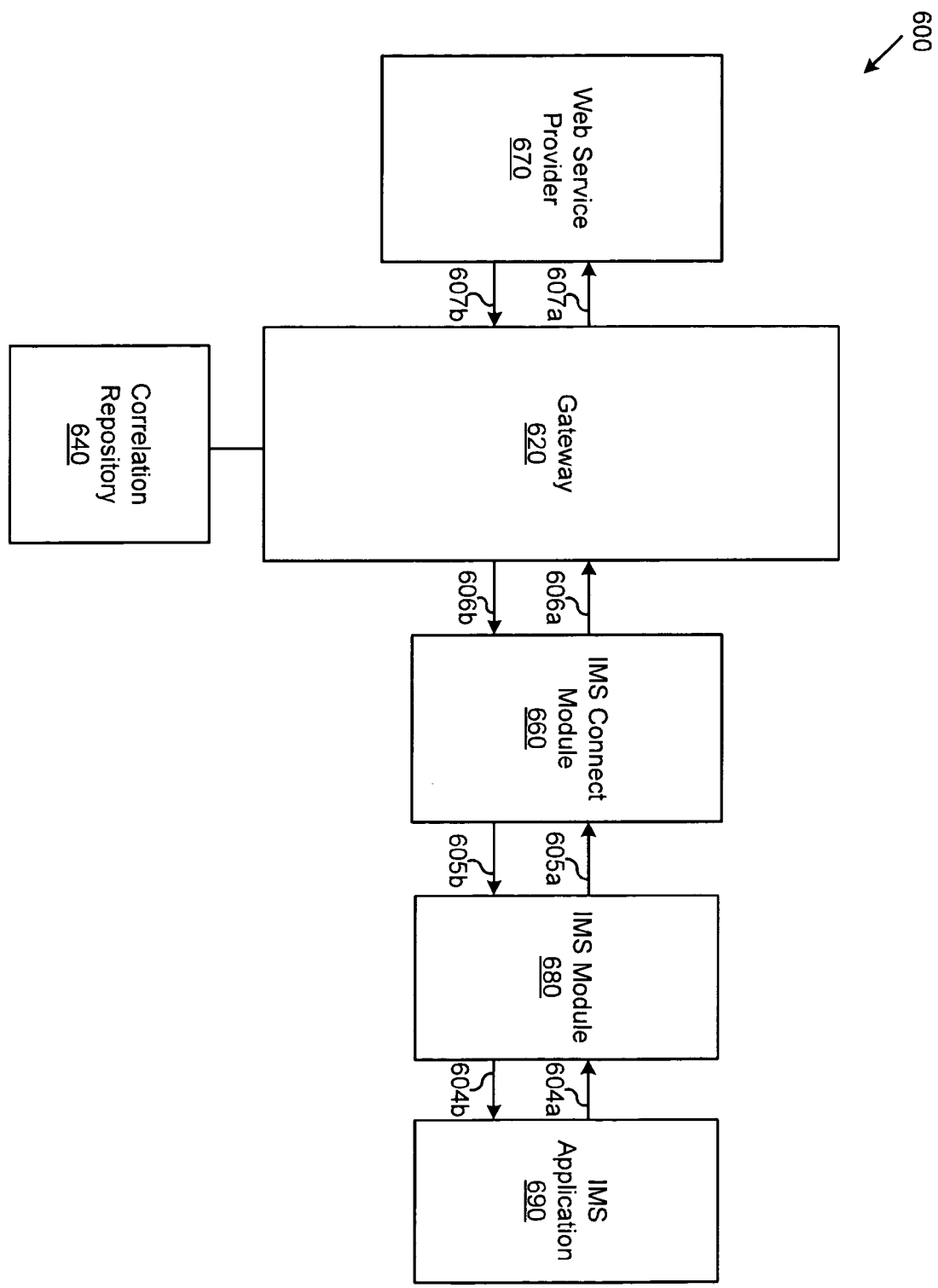
FIG. 6 is a schematic block diagram illustrating one embodiment of a system in accordance with the present invention.

FIG. 6 is a schematic block diagram illustrating one embodiment of a system 600 in accordance with the present invention. The system 600 comprises a web service provider 670, a gateway 620, an IMS Connect module 660, an IMS module 680, and an IMS application 690. The gateway 620 further comprises a correlation repository 640. The components of system 600 serve similar purposes to those described above with respect to the components of system 100 with the same names. In addition, the gateway 620 working in cooperation with the IMS Connect module 660, the IMS module 680 and the IMS application 690 serve a web service client role. In system 100, the web service client 110 requested web services of the gateway 120. In system 600, the gateway 620 acts as a web service client or web service consumer.

Web service provider 670 is a SOAP enabled web service provider. Web service clients request web services of a web service provider 670 by establishing a SOAP conversation with the web service provider 670. The web service provider 670 may be a computing device running an operating system such as Windows, AIX, Solarix, Linux, or z/OS. In fact, the web service provider could be a system 100 comprising an additional gateway 120 and an IMS module 180 acting as a web service provider.

System 600 generally illustrates the case where the gateway 620 and the IMS components 660, 680, and 690 cooperate to act as a web service client. IMS application 690 may be an application or a program executing as part of IMS module 680. IMS application 690 may be a financial transaction program which is configured to retrieve the cash balance of a stock trading account. The stock trading account may be accessible through a web service provider 670. The IMS application 690 is generally capable of communicating with the IMS module 680 but is not capable of issuing SOAP requests to the web service provider 670. The gateway 620, the IMS connect module 660, and the IMS module 680 provide the functionality necessary for the IMS application to call out to the web service provider 670 and receive a web service response in a format that the IMS application 690 may understand.

The IMS module 680 is a transactional manager and hierarchical database system. The IMS module 680 provides the environment in which the IMS application 690 executes. The IMS module 680 and the IMS Connect module 660 serve functions similar to those described earlier with respect to the IMS module 180 and the IMS Connect module 160. The IMS module 680 and the IMS Connect module translate byte code calls from the IMS application 690 into XML messages understandable to the gateway 620.

The gateway 620 is further configured to receive XML-based web service requests from the IMS Connect module 660 and pass those to the web service provider 670 as SOAP messages. The gateway 620 presents a modem, SOAP interface to the web service provider 670 and an XML interface to the IMS Connect module 660. The gateway further comprises a correlation repository 640 similar to the correlation repository 140.

In one embodiment, to initiate a web service request, IMS application 690 queues a web service message 604a to the IMS module 608. The IMS application embeds in the web service message 604a a web service identifier (WSID). The WSID identifies the web service provider with which the IMS application desires to communicate. The WSID may be a URN, a name, a sixty-four bit integer, or other identifier.

The IMS module receives the web service request message and passes it to the IMS Connect module 660 as a web service request message 605a. The IMS Connect module 660 translates the message as necessary into an XML message, using the same adapter and conversion module described earlier. The IMS Connect module 660 passes the XML web service request 606a to the gateway 620.

The gateway 620 parses the XML web service request 606a and extracts the WSID from the message. The gateway extracts a correlation mapping 442 from the correlation repository 640 based on the extracted WSID. The extracted correlation mapping 442 may comprise a URN, URI, or URL. It may also comprise other parameters which the gateway will use either in processing the web service request 606a or in routing the web service request 606a. Additional correlation parameters may include a security identifier, a priority level, as well as other information. The gateway 620 passes the web service request as a SOAP message 607a to the web service provider 670, selected according to the extracted correlation mapping 442.

The web service provider 670 processes the web service request 607a and returns a SOAP encapsulated web service response 607b. The gateway 620 may handle the response 607b synchronously or asynchronously. The gateway 620 forwards the response 607b to the IMS Connect module 660 which translates the response 606b as needed from an XML message to a byte language message 605b. The IMS Connect module 660 passes the response 605b to the IMS module 680. The IMS module 680 passes the response 604b to the IMS application 690 which processes the response 604b.

Figure 7:
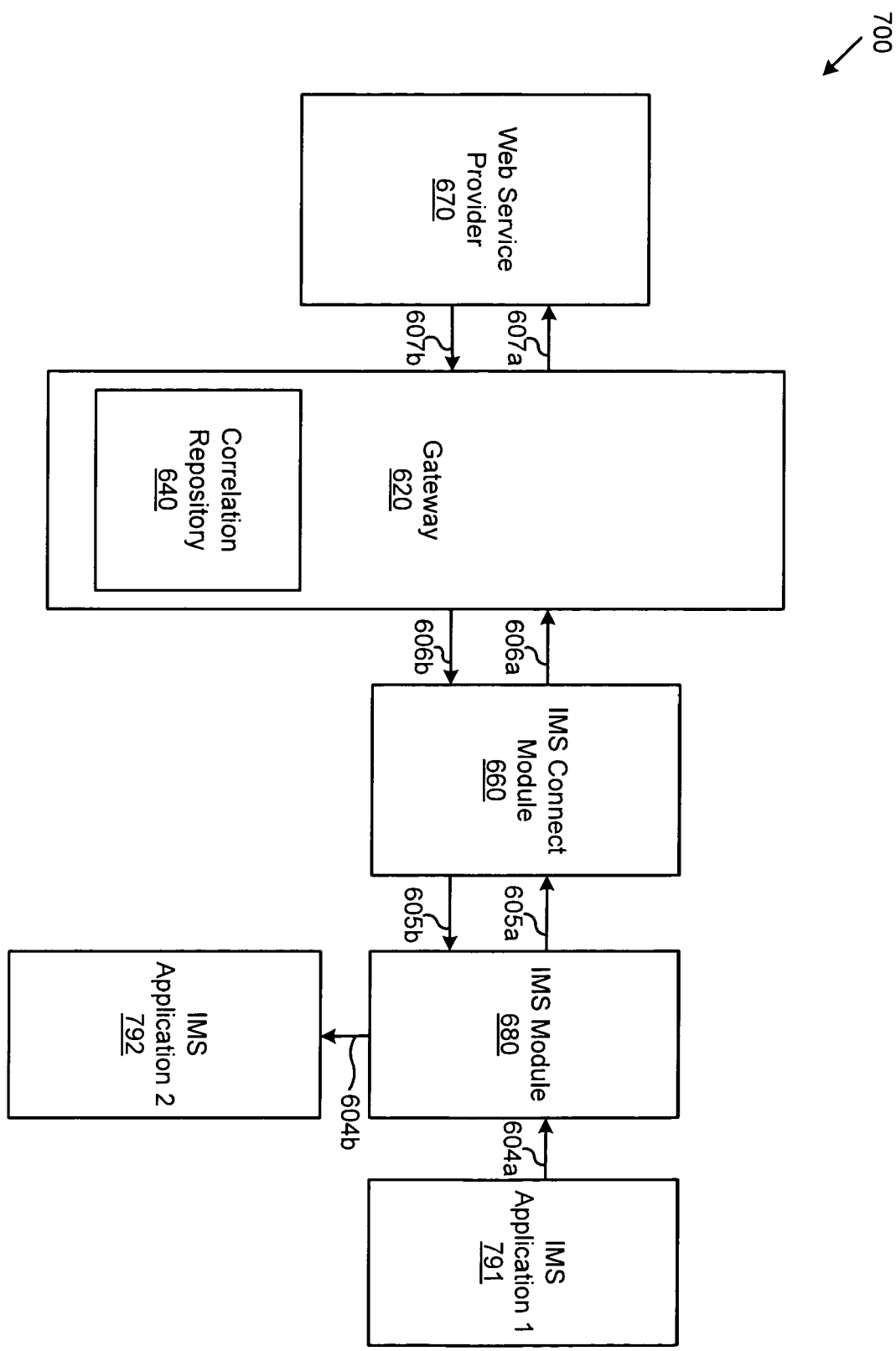
FIG. 7 is a schematic block diagram illustrating one embodiment of a system in accordance with the present invention.

FIG. 7 illustrates an alternative embodiment of a system 700 of the present invention. The system 700 is similar to system 600, except that system 700 illustrates an asynchronous processing scheme with respect to the IMS module 680 and the IMS application1 791 and IMS applications 792. IMS application1 791 initiates the web service message 604a as in system 600. However, IMS application1 791 does not wait for a response 604b. IMS application2 792 waits for the response 604b. IMS module 680 is configured to forward the response to IMS application2 792. In this manner, IMS application1 791 need not block and wait for the response 604b. IMS application1 791 is able to continue processing other requests, and the system 700 runs more efficiently. The IMS module 680 may select the response route at the time that message 604a is received. Alternatively, gateway 620 may embed correlation parameters based on the initial WSID received on the web service request 606a. The embedded correlation parameters may indicate to the IMS Connect module 660 and/or the IMS module 680 to which IMS application 792 to deliver the response message 604b.

Figure 8:
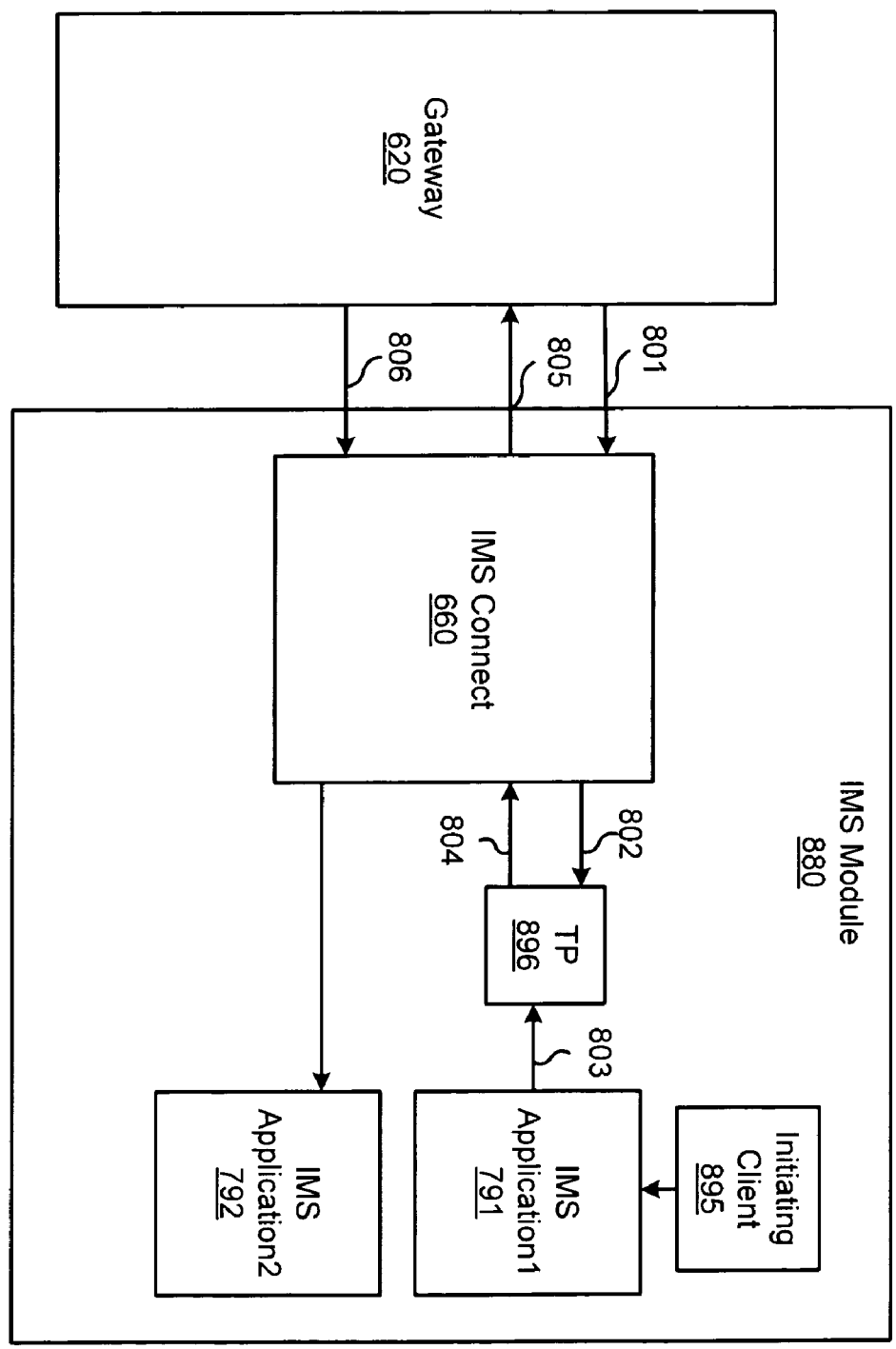
FIG. 8 is a schematic block diagram illustrating one embodiment of a system in accordance with the present invention.

FIG. 8 illustrates an expanded view of the gateway 620 and the IMS module 880 of system 700. In this illustration, the IMS module comprises the IMS Connect module 660 and the IMS applications 791 and 792. IMS module 880 further comprises an initiating client component 895.

In one embodiment of the system 700, upon initialization of gateway 620, gateway 620 sends a resume transaction pipe (TPIPE) 801 to the IMS Connect module 660. The IMS Connect module 660 creates, initializes, or connects to 802 a transaction program 896 in response to the resume TPIPE command 801. Initializing client 895 issues a command to execute IMS application1 791. The initializing client 895 may be an operator sitting at a terminal or an independent program running on the same or a separate computing device from the IMS module 880. The initiating client 895 may be requesting the account balance of an account accessible by web service provider 670.

Upon initiation, IMS application1 791 queues a web request 803 to the TP 896. The TP 896 may be thought of as a queue which receives messages and saves them until the IMS Connect module 660 is able to process the message. If flow 803 precedes flow 802, then the TP 896 will hold the request messages until the IMS Connect module 660 is ready to process the request messages. IMS Connect module 660 in turn processes the message 804, translates it as necessary as described earlier, and forwards an XML web request 805 to gateway 620. The gateway 620 executes the processing described earlier to send and receive the web service response to a SOAP enabled web service provider 670 (not shown).

The gateway 620 sends the response 806 to the IMS Connect module 660 which forwards the asynchronous response to a second IMS applications 792 for final processing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A Simple Object Access Protocol (SOAP) gateway for facilitating interaction between a web service client and Information Management Systems (IMS) software product, the gateway comprising:
   a computer readable storage medium;
   Information Management Systems (IMS) software product comprising an IMS Connect software product, an IMS datastore, and an IMS application, the IMS software product stored on the computer readable storage medium;
   a SOAP endpoint configured to receive a SOAP message containing an XML encoded web service request from a SOAP enabled web service client;
   a SOAP message processor configured to extract the web service request from the SOAP message;
   a correlation module configured to select a predefined correlation mapping based on an identifier extracted from the web service request, the identifier comprising a unique web service provider identifier (WSPID), and the correlation mapping comprising a mapping between the unique WSPID and one or more correlation parameters;

a header module configured to build a header and combine the header with the web service request, the header comprising an IMS datastore identifier, an IMS application identifier, an IMS Connect identifier, and an IMS security identifier, wherein the header module builds the IMS datastore identifier, the IMS application identifier, the IMS Connect identifier, and the IMS security identifier from values in the selected correlation mapping; and an internet protocol (IP) connection module configured to establish an IP connection to the IMS Connect software product using an IP address and a port number taken from the IMS Connect identifier, the IP connection module further configured to transmit the web service request to the IMS Connect software product over the IP connection.

2. The gateway of claim 1 wherein the IMS Connect software product comprises:

a TCPIP module configured to receive the IP connection from the IP connection module; a data translator configured to convert between an XML message and an Open Transaction Manager Access (OTMA) call; and an OTMA module configured to communicate with IMS applications.

3. The gateway of claim 2 wherein the IMS Connect software module extracts the IMS application identifier and the IMS datastore identifier from the header of the web service request and the data translator converts the web service request into an OTMA request call to an IMS application identified by the IMS application identifier from a plurality of IMS applications using an IMS datastore identified by the IMS datastore identifier.

4. The gateway of claim 3 wherein the IMS security identifier comprises a security name and a password, and wherein the IP connection module transmits the security name and the password to the IMS Connect software module which uses the security name and the password to authenticate the web service request.

5. The gateway of claim 3 wherein the IMS application sends a response containing a response to the OTMA request call back to the OTMA module and wherein the data translator converts the response into an XML based web service response.

6. The gateway of claim 5, wherein the gateway processes the web service response synchronously, in that the SOAP processor encapsulates the web service response and the SOAP endpoint transmits the web service response to the web service client in the same SOAP session in which the web service request arrived.

7. The gateway of claim 1, the gateway further comprising a correlation tool configured to add an additional correlation mapping based on a new WSPID.

8. The gateway of claim 1, the gateway further comprising a correlation repository configured to hold a set of correlation mappings.

9. The gateway of claim 8 wherein the correlation repository is a file accessible by the correlation module.

10. A computer readable storage medium tangibly embodying a program of machine-readable instructions executable by a digital processing apparatus to perform an operation to facilitate interaction between a SOAP client and a web service running on an Information Management System (IMS), the operation comprising:

receiving a SOAP message containing an XML encoded web service request from a SOAP client, the operation of receiving the SOAP message executed by machine-readable instructions stored within a machine-readable signal bearing medium coupled to a digital processor;

extracting an identifier from the web service request; selecting a predefined correlation mapping based on the extracted identifier, the extracted identifier comprising a unique web service provider identifier (WSPID), and the correlation mapping comprising a mapping between the unique WSPID and one or more correlation parameters;

modifying the web service request to include an Information Management System (IMS) datastore identifier, an IMS security identifier, and an IMS application identifier retrieved from the correlation mapping; and sending the modified web service request to the Information Management System (IMS) software product.

11. The computer readable storage medium of claim 10 wherein the correlation mapping maps a single WSPID to an IMS datastore identifier, an IMS application identifier, an IMS Connect identifier, and an IMS security identifier.

12. The computer readable storage medium of claim 10 further comprising configuring a correlation repository containing correlation parameters indexed according to web service provider identifiers (WSPIDs) from which the correlation mapping is selected.

13. The computer readable storage medium of claim 10 further comprising:

asynchronously with respect to the web service request, receiving an XML encoded web service response from the IMS software product; extracting a second identifier from the web service response; selecting a second correlation mapping based on the second identifier wherein the second correlation mapping comprises a response SOAP client; encapsulating the web service response in a SOAP envelope; and sending the modified web service response to the response SOAP.

14. The computer readable storage medium of claim 10 wherein the IMS Connect identifier comprises an Internet Protocol (IP) address and wherein sending the modified web service request to the IMS software product further comprises establishing an Internet Protocol (IP) connection to the IMS software product using the IP address from the IMS Connect identifier, such that the web service request is sent over the IP connection.

15. A method of deploying a SOAP gateway to facilitate interaction between a SOAP client and a web service running on an Information Management System comprising integrating computer-readable code into a computing system, wherein the code in combination with the computing system is capable of performing:

receiving a SOAP message containing an XML encoded web service request from a SOAP client, the operation of receiving the SOAP message executed by machine-readable instructions stored within a computer readable storage medium coupled to a digital processor; extracting an identifier from the web service request;

selecting a predefined correlation mapping based on the extracted identifier;

modifying the web service request to include an Information Management System (IMS) datastore identifier and an IMS application identifier taken from the correlation mapping, wherein the identifier is a web service provider identifier (WSPID) and wherein the correlation mapping maps a single WSPID to an IMS datastore identifier, an IMS application identifier, an IMS Connect identifier, and an IMS security identifier; and sending the modified web service request to the Information Management System (IMS) software product.

16. The operation of claim 15 further comprising:
receiving an XML encoded web service response from the IMS software product; encapsulating the web service response in a SOAP envelope; and
sending the modified web service response to the SOAP client from which the original XML encoded web service request was received.

17. The operation of claim 15 further comprising configuring a correlation repository containing correlation parameters indexed according to web service provider identifiers (WSPIDs) from which the correlation mapping is selected.

* * * * *